US009042542B2

(12) United States Patent
Shaffer et al.

(10) Patent No.: US 9,042,542 B2
(45) Date of Patent: May 26, 2015

(54) INTEGRATED ALERTING

(75) Inventors: Shmuel Shaffer, Palo Alto, CA (US);
Mukul Jain, San Jose, CA (US);
Labhesh Patel, San Francisco, CA (US);
Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 2238 days.

(21) Appl. No.: 11/686,838

(22) Filed: Mar. 15, 2007

(65) Prior Publication Data
US 2008/0226046 A1 Sep. 18, 2008

(51) Int. Cl.
*H04M 1/00* (2006.01)
*H04M 15/06* (2006.01)

(52) U.S. Cl.
CPC .................... *H04M 15/06* (2013.01)

(58) Field of Classification Search
CPC ....... H04W 4/22; H04W 76/007; H04W 4/02; H04M 11/04; H04M 2242/04; H04M 2242/30; H04M 1/27455; H04M 1/72572; H04M 1/72583; H04M 2250/10; H04M 3/53375; H04M 17/023; H04M 11/045; H04M 7/006; H04M 19/04; H04M 19/041; H04M 15/00
USPC .............................. 379/201.01, 36–51, 111, 379/373.01–373.04; 455/404.1, 404.2, 455/401.1, 521
See application file for complete search history.

(56) References Cited

U.S. PATENT DOCUMENTS

| 6,816,878 | B1* | 11/2004 | Zimmers et al. ............... 709/200 |
| 7,817,982 | B1* | 10/2010 | Chu et al. .................. 455/404.1 |
| 2002/0131397 | A1* | 9/2002 | Patel et al. ..................... 370/349 |
| 2002/0171552 | A1* | 11/2002 | Tate ............................ 340/573.1 |
| 2007/0025543 | A1* | 2/2007 | Vadlakonda et al. ..... 379/265.02 |

* cited by examiner

*Primary Examiner* — Akelaw Teshale
(74) *Attorney, Agent, or Firm* — Haynes and Boone, LLP

(57) ABSTRACT

In a wide-area communication system, users or numbers in the system to be alerted are ranked so to improve the efficiency of the alert calls. Rankings are based on various factors, including whether two or more users are on the same active call, whether a user is on an active call, how recently a user ended a call, and whether a user recently missed a call. Within rankings, there may be multiple callers or numbers. These users may further be ranked, such as by determining which caller is expected to end a call first based on the current elapsed time of the call and the average call duration for that user or number.

21 Claims, 3 Drawing Sheets

INTEGRATED ALERTING

TECHNICAL FIELD

The present disclosure relates generally to methods and systems for calling or alerting system users when a need arises.

BACKGROUND

Phone or call systems employ various methods or protocols to notify system users when a triggering event arises, such as an emergency situation, in the area. General areas of triggering events might be a terrorist attack, a natural disaster, or an industrial accident. Examples could include release of a toxic substance into the atmosphere, radiation release from a nuclear facility, impending tidal wave, hurricane, or tornado, or a flash fire. Such triggering events would be occurrences in which people would need to be notified immediately or at least as soon as possible so that proper action can be taken.

Conventional wide-area alerting systems might automatically initiate alerting calls to thousands of users in the system, based on a pre-defined list of phone numbers. The system sequentially calls the numbers one at a time and processes each call depending on the outcome of the call. If a person answers, the system note that this number does not need to be called again. If an answering machine picks up or if there is no answer after a predetermined number of rings, the system notes this and will attempt the number again at a later time. This static type of alerting can take a very long time to complete, since only a limited number of calls can be made during any given time. In addition, the efficiency of such a system can be very low. For example, assume that calls to most of the numbers at the top of list are not answered by a live person, but that numbers at the bottom of the list do have live people by the phone. In this situation, the people associated with the bottom numbers needlessly have to wait while the system goes through many unanswered numbers.

Therefore, there is a need for a more efficient call alerting system that overcomes the disadvantages of conventional system discussed above.

BRIEF DESCRIPTION OF THE DRAWINGS

Like element numbers in different figures represent the same or similar elements.

DESCRIPTION

Overview

In accordance with an embodiment of the invention, a method includes ranking or prioritizing numbers on a call list based on factors which would increase the likelihood that calls to users will be answered. Calls are then made, based on the ranking, to alert users of the triggering event. A ranked call list increases the success rate of the call alerts, thereby improving the performance of the system so that available users are notified quicker and the system does not expend unnecessary time trying to reach numbers in which the recipients are unavailable.

Factors, in different embodiments, may include determining whether a number to be alerted is involved in an active call; whether an active call involves more than one number from the call list; whether an active call has exceeded a certain time which can be the same for all active calls or just for that particular number; the average call length for the active call and determining whether the call has exceeded the average call length for that number; and the time elapsed since an active call ended. Once the numbers have been ranked, the alerts are made corresponding to factors involved in the ranking. For example, if an active call has all callers on the list, an alert will first be broadcast to all the callers on that call simultaneously, thereby eliminating the need to call each individually. If one or more callers are not on the list, the alert call is made only to those on the list. In one example embodiment, the system may use a whisper to alert only the callers who are on the alert list.

In accordance with another embodiment of the invention, a call system is configured to receive an alert, rank or prioritize numbers on a call list according to various factors intended to increase the likelihood that initial calls are answered by a live person, and make the calls in order of the ranking, where the manner or type of calls may be different depending on factors involved in the ranking. If two or more numbers are ranked equally, e.g., all have a single caller to be alerted, a second ranking may be used to determine which ones of these to call first. In one embodiment, those numbers which are expected to end the call the soonest are called first, which increases the likelihood that the caller will not have moved away from the phone, resulting in a higher probability that the caller can be reached.

These and other features and advantages will be more readily apparent from the description of example embodiments set forth below taken in conjunction with the accompanying drawings, which are for purposes of illustrating example embodiments only, and not for purposes of limiting the same.

Description of Example Embodiments

Figure 1:
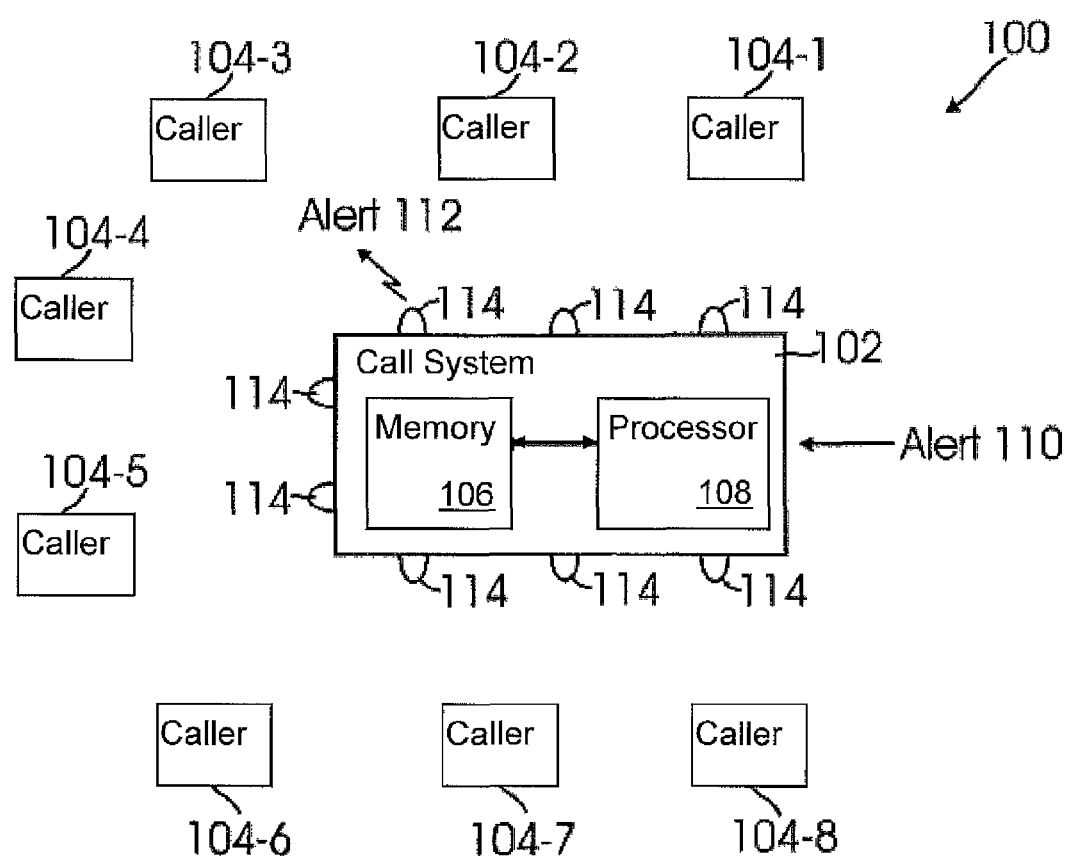
FIG. 1 is a block diagram of a calling system for providing call alerts in accordance with an embodiment of the invention.

FIG. 1 is a block diagram of a network 100 includes a call system 102 and a plurality of end users or callers 104-1 to 104-8 in accordance with one embodiment of the invention. Only eight callers are shown for illustrative purposes, as network 100 can include any number of callers. Each caller 104 is associated with a call or phone number stored in call system 102. Call system 102 can include a memory 106, which may be several distinct memory storage devices or a single storage element, and a processor 108 adapted to perform steps described herein. Call system 102 can also include various elements for receiving an incoming alert trigger 110 and transmitting an out-going alert call 112 to the various users in the network, such as through a finite number of alerting ports 114. Callers 104 can receive out-going alert call 112 using any suitable means, including, but not limited to wireless communication and conventional phone systems, such as POTS, video call, IM, e-mail, or any other multimedia contact. Note that alert calls can be in any suitable format, such as actual voice calls, voice messages, or text messages.

Incoming alert trigger 110 can be transmitted from any suitable source, such as an emergency broadcast service. Once received by call system 102, processor 108 ranks numbers stored in memory 106 for order of calling and type of calling for out-going alert call 112. Although not required, processor 108 may first create or identify a subset of the numbers stored in memory 106 based on the characteristics of incoming alert call 110. For example, if the total number of callers in the system is large, i.e., a very large area network, processor 108 may limit the call list to only those callers within a certain geographic area. Characteristics of the alert call, other than geographic location, may be the nature or anticipated duration of the alert. For example, a nuclear accident would warrant a much larger call list than a localized fire.

Once a call list is determined, whether it is the entire list of numbers or a subset stored in memory 106, processor 108 then ranks the numbers for order of calling, assuming the number of alerting ports is less than the number of users that need to be alerted. Otherwise, call system 102 simply notifies everyone at once. If the numbers are to be ranked, it is based on factors which would increase the likelihood that out-going alert call 112 to callers 104 will be answered during the start of call placement, i.e., calls to numbers at the beginning of the list are more likely to be answered than those at the end of the list. Additional details will be provided below with respect to FIGS. 2 and 3. For example, assume call system 102 determines that the priority for calling is to alert caller 104-1 first, followed by caller 104-2, in sequence, to caller 104-8 being the lowest priority. In this example, callers 104-1 and 104-2 may be on an active call together, callers 104-3 and 104-4 are on separate active calls with calls outside the system, caller 104-5 has just completed a call, caller 104-6 also just completed a call, but more time has elapsed than for caller 104-6, caller 104-7 has had no activity for a while, and caller 104-8 had a recent missed call, i.e., a call was presented to caller 104-8, but was not answered.

Assuming call system intercepts active calls to insert an alert call or message, call system 102 will then first send a single alert call to callers 104-1 and 104-2, so that both callers in the system receive the alert with a single call. Next, call system 102 "whispers" the alert only to caller 104-3 and again to caller 104-4 so that only the caller on the system is alerted and not the party on the other side of the call. After sending these alert calls, call system 102 transmits out-going alert call 112 to caller 104-5, to caller 104-6, to caller 104-7, and to caller 104-8, in that order. In one embodiment, the alert call can be played automatically to the user when the user picks up the handset.

If two or more calls are ranked the same, such as the case for callers 104-3 and 104-4 in the example above, call system 102 can use different methods for determining which caller to notify first when an alerting port is available. One way is to simply call the first one from the list. A second, more refined approach, is to first determine how long each active call (or just the calls having the same rankings) has been in progress, i.e., elapsed time of the call. Using data stored in memory 106, processor 108 can compare the average duration of a call associated with caller 104-3 and 104-4 (or for every number or caller 104). Based on the average duration of the call and the current elapsed time of the active call, processor 108 determines which one of the active calls is most likely to end first. Each active call is ranked from the shortest estimated time for completion to the longest expected time for completion. Alert calls 112 are then made according the rank. In the above example, assume caller 104-4 is expected to end the call sooner than caller 104-3, based on elapsed time and past call history. In this case, call system 102 would make alert call 112 to caller 104-4 first. One reason is that the less time that has elapsed since the call ended, the more likely the caller is still nearby the phone to receive the alert call. In one embodiment, the call system 102 is notified when a caller to be alerted finishes an active call, e.g., within a few seconds. Call system 102 can then, in response, transmit alert call 112 to that caller if an alerting port is available or place that caller at the top of the priority list for the next available alerting port even if the caller was originally at a lower rank. This results in a very high likelihood that the caller will be reached because the caller will have had very little time to move out of range of the call. Note that the above embodiments are set forth for illustrative purposes. For example, a system administrator can create a desired set of priority criteria based on who needs to be alerted and the type of alert.

Figure 2:
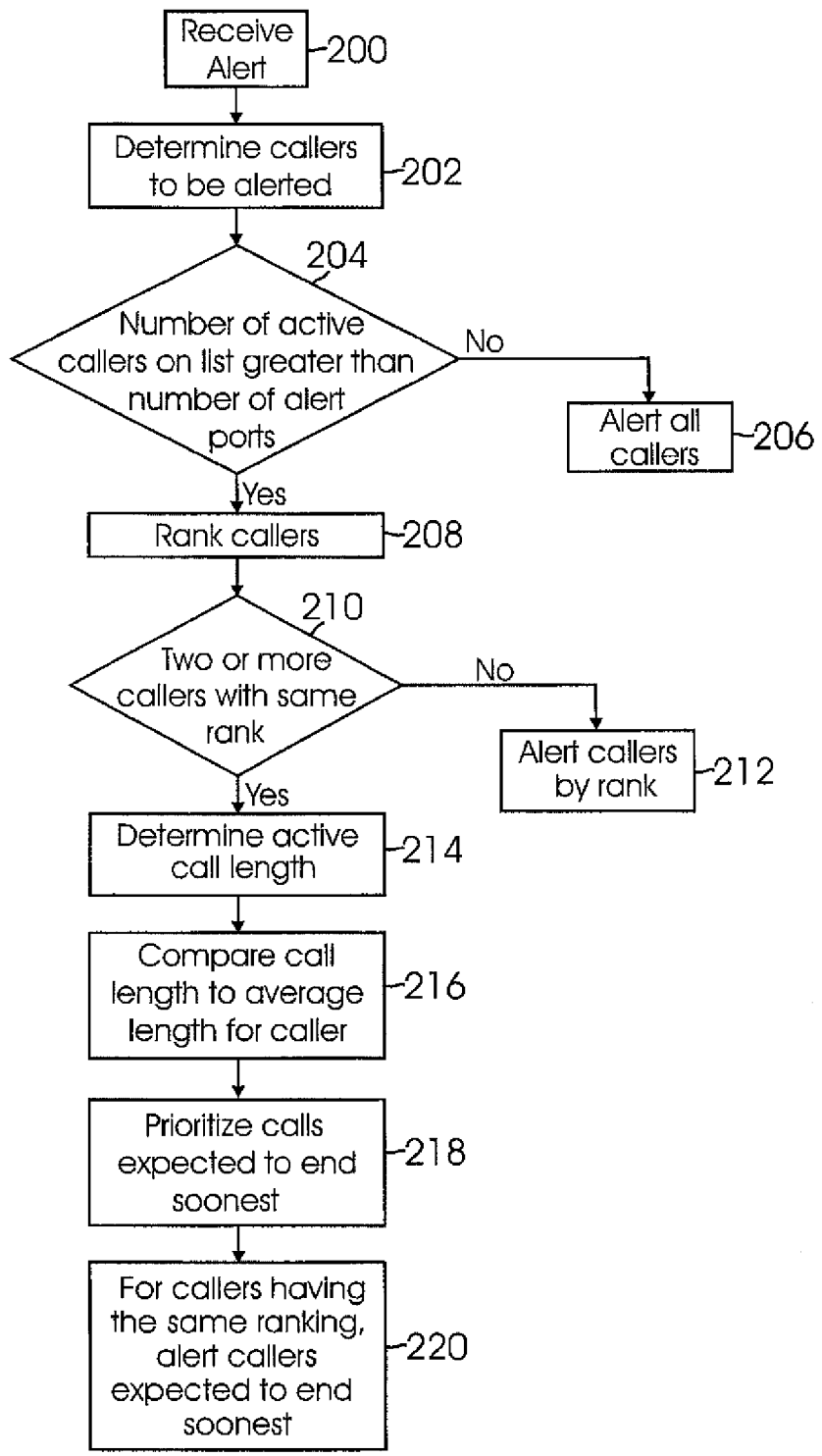
FIG. 2 is a flowchart illustrating one method of providing call alerts to a wide-area phone system.

FIG. 2 is a flowchart illustrating one embodiment for a method of placing alert calls in a wide-area system. First, at operation 200, an alert trigger is received by the system. The alert can be any type of message that needs dissemination to all or some of the users in the system. Types of alerts can be a natural disaster, an industrial accident, a terrorist attack, or any other type of occurrence that requires immediate notification to a large number of people, such as a mountain lion was seen in a specific residential or school area. Examples include release of a toxic substance into the atmosphere, radiation release from a nuclear facility, impending tidal wave, hurricane, or tornado, a nuclear attack, a localized riot, or a flash fire. Once the alert message is received, it is processed, at operation 202, to determine which of the numbers (or callers or users) in the system need to be notified of the alert. Processing may include the type of alert, duration of the alert, and intended audience of the alert (e.g., residences, factories, etc). Some types of alerts do not require all users within the system or network to be alerted. For example, only a specific geographic area may be affected by the alert, such as a localized fire, and may be determined by means such as zip codes, area codes, map coordinates, etc. Especially with very wide area networks, this step can be crucial to improve efficiency of alert notification. The number of callers may be everyone on the system or a sub-set thereof.

Once the phone numbers of callers to be alerted has been determined, operation 204 determines whether the number of callers on the list exceeds the number of alerting ports in the system. If not, i.e., there are sufficient numbers of alerting ports to notify everyone who needs to be alerted, alerts are transmitted to everyone on the list at operation 206. However, if the number of alerting ports is less than the number of callers to be alerted, a ranking of who to call first is determined at operation 208. There are different ways to rank callers, which will be discussed in detail with respect to FIG. 3. In general, the goal of the rankings is to maximize the efficiency of transmitting alert calls, such as by using a single call to notify multiple users, and to increase the likelihood that a caller will answer the alert call, such as by sending alerts to users on active calls or by sending an alert call to callers who have just ended a call.

After the callers to be alerted have been ranked, a determination is made, at operation 210, whether two or more callers have the same rank. If not, i.e., each rank includes only a single caller, then callers are alerted by rank at operation 212. However, if there are two or more callers within a single rank, the process determines which callers within the same rank to call first for the highest likelihood of reaching a caller. First, at operation 214, the length or elapsed time of calls within the same rank are determined. Next, at operation 216, a comparison is made between the length of a current active call to the average length of a call by that user or from that number. This average can be obtained using known methods, such as storing the length of calls from a particular number and calculating the running average after each new call is completed. Calls within the same rank are then prioritized, at operation 218, in order of calls expected to end soonest. In other words, active calls that have exceeded the average call time are ranked higher than active calls that have not exceeded the average call time. Within the former group, calls that have lasted the longest from the average call time are ranked higher, and within the latter group, call times that are closest to the average call time are ranked higher. The result of this operation is that active calls having the same rank within a group are further ranked.

Finally, at operation 220, callers are alerted according to the rankings described above. Callers from the first ranked group of operation 208 are alerted first. If there are multiple callers in the group, alerts are made based on the ranking of these calls from operation 218. Once all the callers in the first group are alerted, alert calls are made to callers in a second ranked group of operation 208, and if there are two or more callers in the second group, they are notified in priority of the ranking of operation 218. This continues until all callers to be alerted have been called. Note that in different embodiments, different operations can be deleted, while still achieving benefits of invention. For example, operations 210, 212, 214, 216, 218, and 220 may be deleted so that if two or more callers have the same ranking, the alerts can simply be made in any order within the same ranked group.

Figure 3:
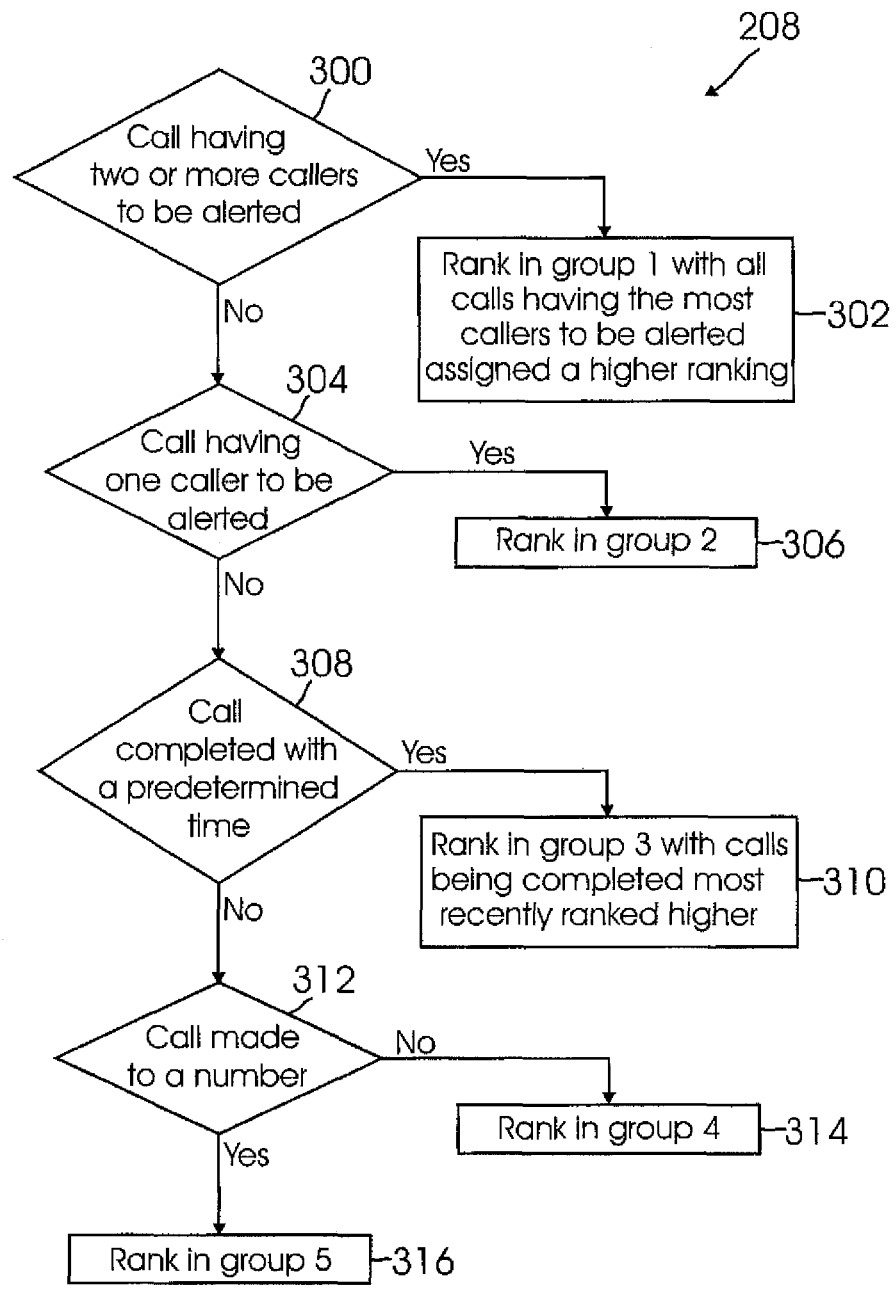
FIG. 3 is a flowchart illustrating different embodiments of ranking calls for use in the flowchart of FIG. 2.

FIG. 3 is a flowchart illustrating one example embodiment for ranking calls for use in operation 208 of FIG. 2. At operation 300, a determination is made whether an active call has two or more callers or users who need to be alerted. If so, these users are ranked in a first group, at operation 302, with users on active calls with the most users are ranked higher within the group. For example, if one call has two users to be notified, and another call has three users to be notified, the call with three users is ranked higher. This first grouping enables a call system to broadcast a single message or join a call with multiple users who need to be alerted at once, thereby increasing the efficiency of the call. In other words, a single call can be used to alert multiple users.

If no active calls have multiple users to be alerted, a determination is made, at operation 304, whether any active calls have one user to be alerted. If so, those users are ranked in a second group at operation 306. Since the system knows users to be notified are on a call, it can broadcast a message or join the active call and know that the user will get the alert. Next, at operation 308, the system determines whether a call was completed within a predetermined amount of time, i.e., a recent call. This amount of time, e.g., two minutes, can be variable or a constant of any suitable number, depending on various factors, such as type of number (e.g., residence or business, where the amount of time can be longer in a business) and time of day (e.g., day or night, where the amount of time can be longer at night). Users within this group are more likely to be reachable because they just completed a call and should still be within communication distance with a phone. These users are ranked in a third group, with calls more recently completed calls being ranked higher.

Next, at operation 312, a determination is made whether a call was placed to a user or number. If not, then those users or numbers on the alert list are ranked in a fourth group at operation 314. Basically, these are numbers in which there has not been any recent activity, i.e., no recent calls and no calls that were placed to these users or numbers. A further refinement of this group can be that numbers with the most recent activity (e.g., an active call) are ranked higher within the group.

If a call was placed to a user or number, that call is ranked in a fifth group at operation 316. In this case, a call was placed, but no one picked up the call (since operation 308 determined that a call was not completed). Thus, a missed call, which in this embodiment indicates the lowest chance of the user being available to answer the alert, is ranked in the fifth and last group. Once all the calls on the alert list are ranked, the calls are made in order as alerting ports become available. We note again that the example embodiment of FIG. 3 is not limiting and that any policy-based ranking, either static or configurable, may be suitable.

Alert calls (or alerts) can be made by any suitable means, including, but not limited to wireless communications, wired communications, conventional telephone service, text messaging, etc. The user (caller or number) then receives the corresponding alert call, either as a live voice, a recording, or a text message.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
   receiving an alert trigger within a network having a plurality of alerting ports and users;
   determining selected ones of the users within the network to be alerted;
   ranking, using at least one priority criteria, the selected ones in order of likelihood of being alerted live via an alert call if the number of alerting ports is less than the number of selected users; and
   transmitting alerts to the selected ones in order of the ranking.

2. The method of claim 1, wherein the priority criteria comprises whether two or more of the selected ones are on a same active call.

3. The method of claim 1, wherein the priority criteria comprises whether one of the selected ones is on an active call.

4. The method of claim 1, wherein the priority criteria comprises whether one of the selected ones was on an active call within a predetermined amount of time.

5. The method of claim 1, wherein the priority criteria comprises whether one of the selected ones missed a call within a predetermined amount of time.

6. The method of claim 1, wherein the priority criteria comprises multiple criteria of whether two or more of the selected ones are on a same active call, whether one of the selected ones is on an active call, whether one of the selected ones was on an active call within a predetermined amount of time, and whether one of the selected ones missed a call within a predetermined amount of time, in order of highest to lowest priority.

7. The method of claim 1, further comprising, after the ranking:
   determining if two or more of the selected ones have the same ranking;
   for each of the ones having the same ranking, compare the length of an active call with the average length of the call associated with the user;
   prioritizing the selected ones having the same ranking based on calls expected to end the soonest; and
   transmitting alerts to users in the same ranking based on the prioritizing.

8. The method of claim 1, wherein the alert is an emergency alert.

9. The method of claim 1, further comprising moving a selected user to the top of the ranking when the user completes a call.

10. A method of notifying users of a communication system when an alert trigger is received by the system, comprising the steps of:
   prioritizing a list of alert calls based on likelihood of being received by live users, wherein the prioritizing comprises:
   ranking alert calls in a first group, wherein alert calls in the first group are directed to two or more of the users who are on a same active call;
   ranking alert calls in a second group, wherein alert calls in the second group are directed to one of the users who are on an active call;
   ranking alert calls in a third group, wherein alert calls in the third group are directed to users who completed a call within a predetermined amount of time;
   ranking alert calls in a fourth group, wherein alert calls in the fourth group are directed to users who have not had an active call within the predetermined amount of time; and
   ranking alert calls in a fifth group, wherein alert calls in the fifth group are directed to users who missed a call; and
   transmitting the alert calls in order of ranking in the prioritized list.

11. The method of claim 10, further comprising ranking alert calls within the first group by the number of users on the same active call.

12. The method of claim 10, further comprising ranking alert calls within the third group by calls completely most recently.

13. The method of claim 10, further comprising ranking alert calls within the fourth group by calls having the shortest time since completion.

14. The method of claim 10, further comprising ranking alert calls within the fifth group by calls with most recently missed calls.

15. A system comprising:
   an alerting call center configured to receive an alert trigger and transmit alert calls to a plurality of users on a wide-area network, wherein the call center comprises:
   a plurality of alerting ports;
   a memory configured to store information about users and calls on the network; and
   a processor coupled to the memory and configured to:
      determine selected ones of the users within the network to be alerted, and
      rank, using at least one priority criteria, the selected ones in order of likelihood of being alerted live via an alert call, if the plurality of alerting ports is less than the number of selected ones of the users.

16. The system of claim 15, wherein the priority criteria comprises whether two or more of the selected ones are on a same active call.

17. The system of claim 15, wherein the priority criteria comprises whether one of the selected ones is on an active call.

18. The system of claim 15, wherein the priority criteria comprises whether one of the selected ones was on an active call within a predetermined amount of time.

19. The system of claim 15, wherein the priority criteria comprises whether one of the selected ones missed a call within a predetermined amount of time.

20. The system of claim 15, wherein the priority criteria comprises multiple criteria of whether two or more of the selected ones are on a same active call, whether one of the selected ones is on an active call, whether one of the selected ones was on an active call within a predetermined amount of time, and whether one of the selected ones missed a call within a predetermined amount of time, in order of highest to lowest priority.

21. The system of claim 15, wherein the processor is further configured to determine if two or more of the selected ones have the same ranking; and for each of the ones having the same ranking, compare the length of an active call with the average length of the call associated with the user; and
   prioritize the selected ones having the same ranking based on calls expected to end the soonest.

* * * * *